United States Patent [19]
Lundell

[11] Patent Number: 6,095,266
[45] Date of Patent: *Aug. 1, 2000

[54] DRILL ROD AND METHOD FOR ITS MANUFACTURER

[75] Inventor: Lars-Gunnar Lundell, Sandviken, Sweden

[73] Assignee: Sandvik AB, Sandviken, Sweden

[ * ] Notice: This patent is subject to a terminal disclaimer.

[21] Appl. No.: 08/879,892

[22] Filed: Jun. 20, 1997

[30] Foreign Application Priority Data

Jun. 20, 1996 [SE] Sweden ................................. 96024385

[51] Int. Cl.⁷ .................................................. E21B 10/36
[52] U.S. Cl. ............................................ 175/417; 175/320
[58] Field of Search ..................... 175/320, 414, 175/415, 417, 425

[56] References Cited

U.S. PATENT DOCUMENTS 4,625,814  12/1986  Helasuo et al. ........................ 175/320
5,209,311   5/1993  Donse ..................................... 175/320

*Primary Examiner*—William Neuder
*Attorney, Agent, or Firm*—Burns, Doane, Swecker & Mathis, L.L.P.

[57] ABSTRACT

A rock drilling rod is manufactured by placing free ends of first and second hollow rod components in abutment, and establishing relative rotation between the free ends to friction weld those free ends together. The first component comprises a thread and a clearance portion disposed adjacent the thread. The first component has a hot hardness value of at least about 170 HV1 at 600° C. Prior to friction welding the components together, the thread, clearance portion and central passage of the first component are heat treated against corrosion fatigue. Then, the thread is high frequency hardened to a depth at least as great as the heat treated layer. Following the welding, the weld is cooled while keeping a core hardness of the respective portions of the first and second components disposed immediately adjacent the weld no lower than 390 HV1.

16 Claims, 2 Drawing Sheets

DRILL ROD AND METHOD FOR ITS MANUFACTURER

RELATED INVENTION

The invention is related to that disclosed in concurrently filed Ser. No. 08/879,891 of the present invention (Attorney Docket No. 024444-384).

TECHNICAL BACKGROUND

Conventional rods for rock drilling either have a thread machined directly in the rod, or a thread machined in a rod end forged to a diameter bigger than the rod diameter. Instead of forging up the dimension of rods it is possible to attach, by friction welding, end pieces or guiding pieces having diameters bigger than the rod diameter. Conventional rock drilling rods are most often manufactured from hollow rods, and shank adapters are most often manufactured from solid rods. For threaded rods, at least one thread is often machined in a bumped up (forged) end having a diameter bigger than the rod diameter, while the shank adapters often are machined from rounds.

Instead of forging up the dimension or using extensive machining it has been more and more common to employ a friction weld to interconnect pieces having big differences in diameter. However, due to the friction-generated heat, drill equipment manufactured from conventional drill steel develops weak "soft" zones on both immediate sides (i.e., heat-affected regions) of the weld. These zones have lower hardness than the parts of the rod that are unaffected by the heat and are thus the weakest parts of the rod. To avoid the presence of soft zones in the drill rod, it is necessary to alternatively carburize, normalize or harden this type of rod after friction welding.

Another way is to compensate for the weaker strength in the soft zones by bumping up the rod end before friction welding.

During top hammer drilling under ground, e.g. production drilling or drifter drilling, a one-rod drilling method is used wherein flushing water is conducted through the rod to force the cuttings from the bored hole. Earlier these types of drilling methods often were performed via hand held machines equipped with integrals, i.e. a tool where a cemented carbide insert is brazed directly on a bumped-up end of the rod. Nowadays it is mostly highly mechanized drilling where all the machinery is carried on drill rigs and one rig often has two machines running on the same rig. With the mechanized method it has been possible to increase the effects of the machines. Therefore the rods are subjected to higher forces during both collaring and drilling. In tools for mechanized drilling, the rods are threaded and a separate bit is mounted on the rod. That means that one rod can be used much longer than an integral (one-piece) rod since the rod, instead of being discarded when the bit is worn out, can be furnished with a new bit. Water flushing results in a risk for corrosion fatigue, however, especially since the water, for example in mines, often is acidic and therefore extra corrosive.

The part of this type of rod most susceptible to corrosion fatigue is the threaded end and the clearance portion disposed between the full rod section and the thread.

OBJECT OF THE INVENTION

One object of the present invention is to provide a friction welded drill rod which has a unique resistance against corrosion fatigue, an ability to withstand high impact loads, and a strong weld zone.

Still another object of the present invention is to provide a low temperature heat treatment method for producing a corrosion fatigue-resistant drill rod without softening the core of the thread or the clearance portion to a value below the core hardness of a high temperature heat treated carburized or normalized conventional rock drill steel.

Still another object of the present invention is to provide an effective method for producing drill rods formed of two or more pieces which are friction welded together without the need for subsequent carburation or other high temperature heat treatment process.

SUMMARY OF THE INVENTION

These and other objects are achieved by the present invention which relates to a drill rod component adapted to be friction welded to a steel bit to form a drill rod for percussive rock drilling. The drill rod component is formed of steel and has a central passage extending therethrough. The component includes a first end defining a striking surface, a thread portion disposed adjacent the striking surface, a clearance portion disposed adjacent the thread portion, and a short rod portion disposed adjacent the clearance portion and being of greater diameter than the clearance portion. The short rod portion has a free end adapted to be friction welded to the bit. The thread portion, clearance portion, and central passage are nitrocarburized and have a core hardness of at least 390 HV1. The striking surface is high frequency surface hardened to at least 600 HV1. Portions of the first and second components disposed on immediate sides of the weld have a hardness of at least 390 HV1. Preferably, the high frequency surface hardening of the thread portion is at least as deep as the nitrocarburized region thereof.

The present invention also relates to a method of manufacturing a rock drilling rod. The method comprises the steps of:

A) providing a first steel component of parent material, the first component comprising first and second ends, a thread disposed adjacent the first end, a clearance portion disposed adjacent the thread, and a short rod portion disposed adjacent the clearance portion and having a larger diameter than the clearance portion, the first end defining a striking end, and the second end defining a free end, the first component having a hot hardness of at least about 170 HV1 at 600° C. and a central passage extending therethrough;

B) providing a second steel component of parent material, the second component having a central inner passage and a free end;

C) heat treating the thread, the clearance portion, and the central passage of the first component against corrosion fatigue;

D) high frequency hardening the striking end;

E) placing the free ends of the first and second components in abutment;

F) producing relative rotation between the free ends to form a friction weld therebetween; and G) cooling the weld while keeping a core hardness of respective portions of the first and second components disposed immediately adjacent the weld no lower than 390 HV1.

The present invention also relates to a drill rod formed by the steps described above.

DESCRIPTION OF THE FIGURES

The objects and advantages of the invention will become apparent from the following detailed description of a pre

DETAILED DESCRIPTION OF A PREFERRED EMBODIMENT OF THE INVENTION

Figure 1:
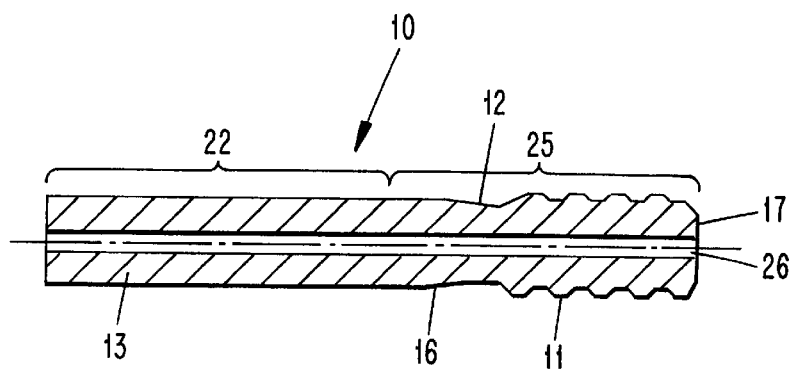
- FIG. 1 shows an end of a threaded rod according to the present invention in a longitudinal cross-section.

The drill rod 10 for percussive drilling comprises first end and second components 25, 22. The first component 25 comprises an externally threaded portion 11 merging with a clearance portion 12, which merges with a short rod portion 16 having a larger diameter than the clearance portion. The threaded portion 11 connects to a striking surface 17. The first component 25 is joined by a friction weld 27 (see FIG. 4A) to the second component 22, which preferably is a long rod portion pr bit 13. A flush channel 26 is provided centrally in the drill rod 10. The free end of the short rod portion 16 prior to welding is substantially of the same diameter as that of the rod portion 13. Instead of being external, the thread portion could constitute an internal thread portion.

To friction weld the components 22, 25 together, the component 25 is held non-rotatable, and the component 22 is rotated, although the reverse would be possible. The components 22, 25 are made of steel and before friction welding starts, the steel at the mating end (free end) of each component is uniform in the core and, as such, is called "parent material".

Figure 2:
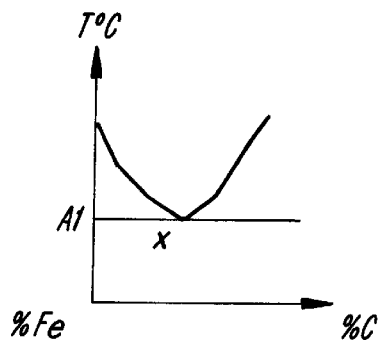
FIG. 2 shows a schematic Fe—C phase diagram of a material used in a component according to the present invention.

Before friction welding, the threaded end 11, the clearance portion 12, and the striking surface 17 of the component 25 are nitrocarburized to increase the corrosion resistance as compared to a carburized or normalized surface. A nitrocarburized layer is designated by the numeral 14 in FIG. 4B and its depth is about 0.3 mm. Alternatively, other types of low temperature surface heat treatments can be used, such as Blacknite®, Colournite®, Tenifer®, etc. Low temperature heat treatment here means that the steel has been heated below A1 temperature (see x in FIG. 2), i.e. no phase transformation to austenite (gamma-phase) is possible.

With conventional rock drill steel type SS 2534 for drifter rods, nitrocarburizing at 550 to 610° C. (Blacknite®, etc.) gives too low of a core hardness due to a tempering effect occurring during heat treatment (see the dotted curve in FIG. 3). In accordance with the present invention, however, the steel to be heat treated by nitrocarburizing (or Blacknite®, Colournite®, etc.) shall have high tempering resistance (hot hardness) and secondary hardening peak at the nitrocarburizing temperature (550–610° C., normally at 580° C.) such that the core hardness does not fall below 390 HV1 (kg) (Vickers Hardness), i.e. giving the core hardness in the nitrocarburized (Blacknite®, etc.) part of the rod enough strength to withstand the impact loads from the shock waves during percussive drilling.

That is, as compared to a conventional drill steel, a steel in accordance with the invention shall have a higher hot hardness (and/or a secondary hardening) at 550–610° C. By "higher hot hardness" is here meant that the steel used in connection with the present invention has a hot hardness of at least about 170 HV1 at 600° C., and preferably about 200 HV1, at 600° C., as compared to a conventional steel wherein the hot hardness is about 100 HV1 at 600° C.

In addition, the striking surface 17 and the threaded portion 11 (but not the clearance portion 12) of the first component 25 are surface hardened to a depth about 2 mm by high frequency treatment (HF-hardening) after nitrocarburizing but before friction welding in order to obtain sufficient support for preventing the nitrocarburized (Blacknite® treated, etc.) layer from cracking under the extensive surface pressure in the thread during drilling.

Figure 4A:
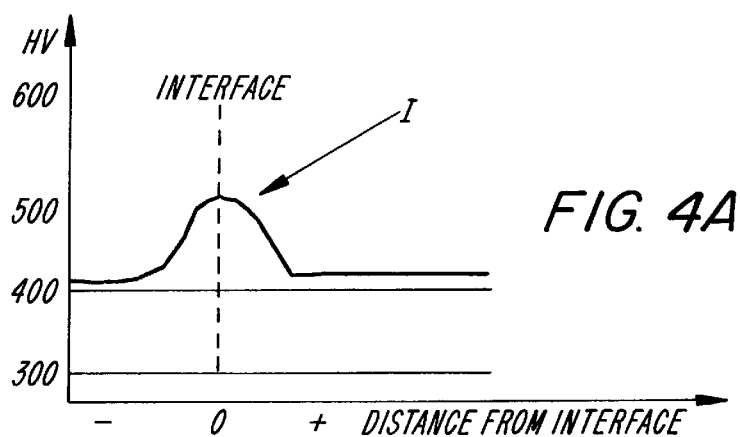
FIG. 4A shows a core hardness distribution in the longitudinal direction of a nitrocarburized and high frequency surface hardened threaded end piece (to the right) and through the friction weld into the rod (to the left)
Figure 4B:
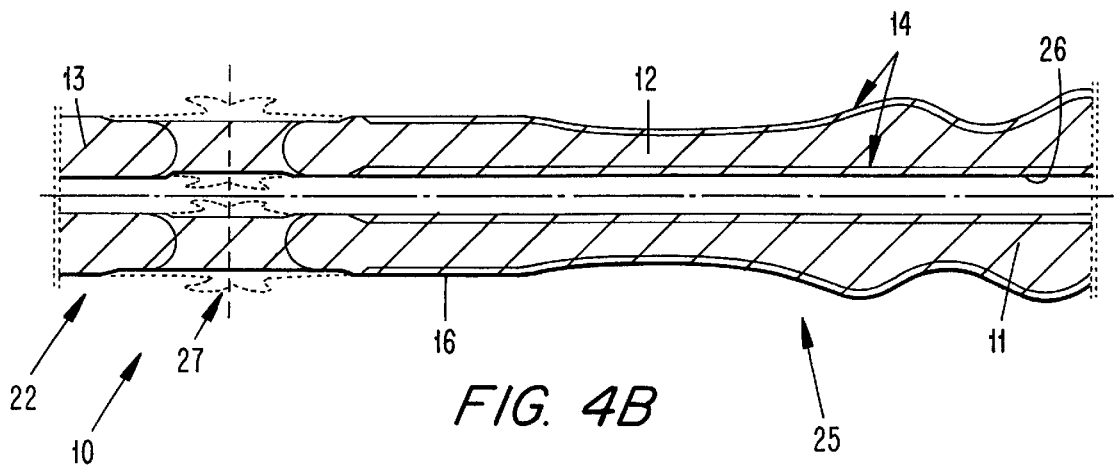
FIG. 4B shows a welded steel joint according to the present invention.
Figure 5:
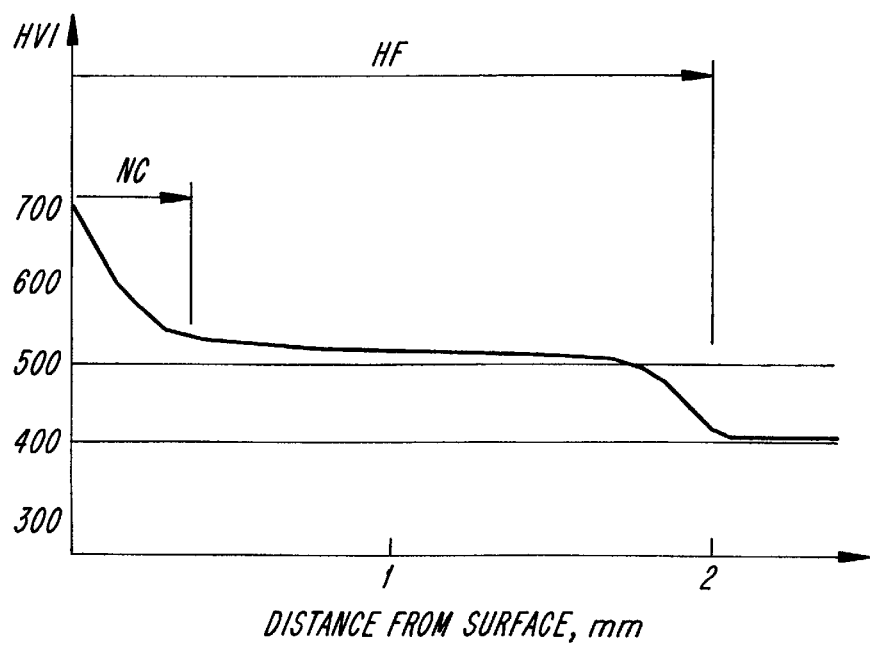
FIG. 5 shows a hardness depth graph as a result of nitrocarburizing and subsequent surface hardening of the thread in a component according to the present invention.

The hardness depth HF about 2 mm of the HF-hardened layer 15, and the 0.3 mm (NC) depth of the nitrocarburized layer 14 are shown in FIGS. 4B and 5.

The operation of the friction welding device, not shown, will now be described. A chuck means (not shown) is opened and the threaded portion 11 of the component 25 is inserted therein. The clamp means is closed to grip the component in an aligned position. Then clamp means (not shown) is opened and the free end of the short rod portion 16 is inserted therein. The clamp means is closed to grip the rod in an aligned position. Then the drill bit (second component) 22 is rotated, and the clamp means feeds the free end of the component 25 towards and into contact with the free end of the bit 22. The heat produced during friction welding makes it possible to forge the abutting ends. The relative rotation of the components 22, 25 is stopped and the components are pushed further together and cooled, as in FIG. 4B. The method of friction welding is more specifically described in SE-A-9502153-1 which is hereby incorporated by reference into the present description.

Figure 3:
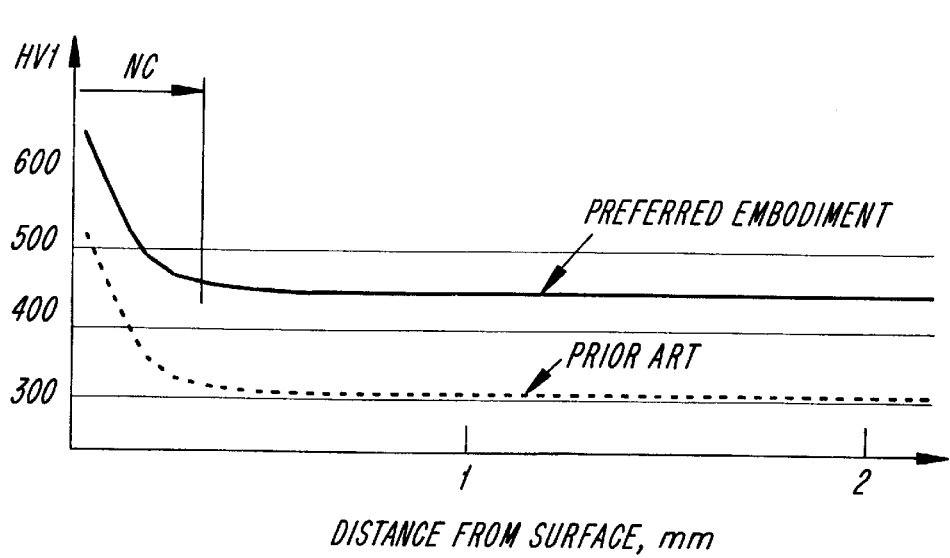
FIG. 3 shows the hardness variation, by means of a dotted curve, from the surface into the core after nitrocarburizing of a conventional rock drill steel (such as type SS 2534) while the solid-line curve in the same graph shows the hardness variation according to the present invention.

Conventional drill steels get too soft of a core hardness after nitrocarburizing (i.e. a hardness of only about 300 HV1), and are not suitable for percussive drilling (see the dotted curve in FIG. 3). During percussive drilling, the rod surface as well as the rod core are subjected to high fatigue stresses from the shock waves and from torsion and bending forces. This means that it is very important that the surface and the core have enough strength to withstand those fatigue stresses. Furthermore, the high pressure at the threads during impact drilling demands enough core hardness to support the nitrocarburized layer.

In accordance with the present invention, then the threaded portion 11 and the striking surface 17 are subjected to the high frequency surface hardening procedure so that the nitrocarburized layers (regions) of the threaded portion 11 and striking surface 17 are hardened to at least 600 HV1 to get enough support for the high local pressure occurring on the pressure side of the threaded portion and on the striking surface 17 during drilling. The hardness of the portion of the high frequency treated layer disposed inwardly from the nitrocarburized layer is more than 500 HV1. It has been found possible to get sufficient hardness and fatigue strength in the core by using a steel that has a chemical composition such that the steel, after being hot rolled and cooled down to a normal rod hardness of about 400 HV1, can be nitrocarburized at about 580° C. and at the same time maintain a core hardness after nitrocarburizing (Blacknite® treatment, etc.) of not less than 390 HV1, as disclosed by the continuous curve in FIG. 3. Thereby the depth NC of the nitrocarburized layer 14 becomes about 0.3 mm. The steel type also gives a hardness in the soft zones about the interface that is at least 390 HV1, i.e. about the same as in conventional rod steels. The core hardness profile is shown in FIG. 4A.

The core hardness of the softest part of the HAZ in the drill rod according to the present invention is about (i.e. ±5%) equal to the hardness of the parent material.

The components 22, 25 shall have a hardness in the HAZ that is comparable with the core hardness of the rod and normally higher than 400. The hardness, shown by a line I in FIG. 4A, in the normally soft zone is at least at the same level as the normal core hardness in a conventional normalized drill rod, i.e. higher than 390 HV1.

The main elements, normally Cr, Mo and V are held at a level that gives a core hardness after nitrocarburizing of at least 390 HV1 and a HAZ hardness of at least 390 HV1.

The steel from which the component 25, or both components 22, 25, is formed comprises Fe, and about 0.15 to about 0.40% C, up to about 1.5% Si, at least about 0.2% Mn, about 0.5 to about 1.5% Cr, about 0.5 to about 4.0% of Ni, about 0.5 to about 2.0% Mo, up to about 0.5% V, up to about 0.5% W, about 0.5% Ti, up to about 0.1% Nb, and up to about 0.05% Al, by weight.

Most preferably, the steel comprises Fe, and about 0.18% C, about 0.9% Si, about 1.2% Cr, about 1.8% Ni, about 0.75% Mo, and about 0.1% V, by weight.

Also small amounts of other elements forming carbides, nitrides or nitrocarbides such as W, Ti, Nb, Ta, Zr could be used in the steel, as those elements give a secondary hardening effect and also slow down the grain growth. Al and B are other elements that can be used as a grain refiner together with nitrogen.

More specifically the method for producing a friction welded product for rock drilling comprises the steps of: (i) providing a hollow threaded component of a parent material having a high hot hardness of at least about 170 HV1 at 600° C., (ii) heat treating the threaded portion 11, the inner passage 26 and the clearance portion 12 of the first component 25 against corrosion fatigue preferably by nitrocarburizing, (iii) high frequency surface hardening the threaded portion 11 and the striking surface 17, (iv) providing clamp means for clamping the first component 25, (v) providing rotation means for rotating the second component 22, (vi) putting the free ends of the first and second components together, (vii) rotating the first and second components relative to each other so as to form a weld 27, and (viii) cooling the weld to room temperature, keeping the lowest core hardness of the heat affected zone at least at about 390 HV1. It is, however, understood that either of the components 22 and 25 may be stationary while the other component is rotated during friction welding. Preferably the free ends of rotatable component 22 and non-rotatable component 25 that are to be connected, are free from joint preparation and have free end surfaces oriented substantially perpendicular to a rotational axis.

Thus, main features of the present invention a drill rod wherein the risk of corrosion fatigue is decreased in the threaded portion 11 and in the clearance portion 12 by heat treating, preferably by nitrocarburizing the first component 25 and then friction welding the first component to a rod 13 that might be carburized, normalized, nitrocarburized, etc.

Although the present invention has been described in connection with a preferred embodiment thereof, it will be appreciated by those skilled in the art that additions, deletions, modifications, and substitutions not specifically described may be made without departing from the spirit and scope of the invention as defined in the appended claims.

What is claimed is:

1. A drill rod component adapted to be friction welded to a steel bit to form the drill rod for percussive rock drilling, the component being formed of steel and including a central passage extending therethrough, the component including a first end defining a striking surface, a thread portion disposed adjacent the striking surface, a clearance portion disposed adjacent the thread portion, and a short rod portion disposed adjacent the clearance portion and being of greater diameter than the clearance portion, the short rod portion having a free end adapted to be friction welded to the bit; the thread portion, clearance portion and central passage being nitrocarburized and having a core hardness of at least 390 HV1; the striking surface being high frequency surface hardened to at least 600 HV1; portions of said first and second components disposed on immediate sides of the weld having a hardness of at least 390 HV1.

2. The drill rod component according to claim 1, wherein the steel comprises Fe, about 0.15 to about 0.40% C, up to about 1.5% Si, at least about 0.2% Mn, about 0.5 to about 1.5% Cr, about 0.5 to about 4.0% of Ni, about 0.5 to about 2.0% Mo, up to about 0.5% V, up to about 0.5% W, about 0.5% Ti, up to about 0.1% Nb, and up to about 0.05% Al, by weight.

3. The drill rod according to claim 1, wherein the steel comprises Fe, and about 0.18% C, about 0.9% Si, about 1.2% Cr, about 1.8% Ni, about 0.75% Mo, and about 0.1% V, by weight.

4. The drill rod according to claim 1, wherein the thread portion is high frequency surface hardened to a depth at least as great as the depth of nitrocarburization thereof.

5. The drill rod component according to claim 4, wherein the high frequency surface hardening of the thread portion extends deeper than the nitrocarburized region thereof and has a hardness greater than 500 HV1.

6. The drill rod according to claim 5, wherein a depth of the nitrocarburized layer is about 0.3 mm, and a depth of the high frequency surface hardening is about 2.0 mm.

7. The drill rod according to claim 1, wherein the striking surface is nitrocarburized.

8. The drill rod component according to claim 1 wherein the steel comprises Fe, and about 0.15 to about 0.40% C, at least about 0.2% Mn, about 0.5 to about 1.5% Cr, about 0.5 to about 4.0% Ni, about 0.5 to about 2.0% Mo, and about 0.5% Ti, by weight.

9. The drill rod component according to claim 8, including up to about 1.5% Si.

10. The drill rod component according to claim 8, including up to about 0.5 V.

11. The drill rod component according to claim 8, including up to about 0.5% W.

12. The drill rod component according to claim 8, including up to about 0.1% Nb.

13. The drill rod component according to claim 8, including up to about 0.05% Al.

14. A drill rod formed by the steps of:
A) providing a first steel component of parent material, the first component comprising first and second ends, a thread disposed adjacent the first end, a clearance portion disposed adjacent the thread, and a short rod portion disposed adjacent the clearance portion and having a larger diameter than the clearance portion, the first end defining a striking end, and the second end defining a free end, the first component having a hot hardness of at least about 170 HV1 at 600° C. and a central passage extending therethrough;

B) providing a second steel component of parent material, the second component having a central inner passage and a free end;

C) heat treating the thread, the clearance portion, and the central passage of the first component against corrosion fatigue;

D) high frequency hardening the striking end;

E) placing the respective free ends of the first and second components in abutment;

F) producing relative rotation between the free ends to form a friction weld therebetween; and G) cooling the weld while keeping a core hardness of respective portions of the first and second components disposed immediately adjacent the weld no lower than 390 HV1.

15. The drill rod according to claim 14, wherein step D includes high frequency hardening the thread to a depth at least as great as the depth of heat treatment performed in step C.

16. The drill rod according to claim 14, wherein step C further comprises heat treating the striking surface.

* * * * *